United States Patent [19]

Reichert et al.

[11] Patent Number: 4,785,448

[45] Date of Patent: Nov. 15, 1988

[54] SYSTEM FOR COMMUNICATING DIGITAL DATA ON A STANDARD OFFICE TELEPHONE SYSTEM

[76] Inventors: Andrew R. Reichert, 176 Shady Grove La., Thousand Oaks, Calif. 91361; William J. Schirmer, 19543 Hart St., Reseda, Calif. 91335; Nicholas M. Esser, 1063 Balsamo Ave., Simi Valley, Calif. 93065; Bradley R. Nelson, 13160 Williams Ranch, Moor Park, Calif. 93021; Lauren T. May, 20110 Kinzie St., Chatsworth, Calif. 91311; Stewart C. Brown, 2008B W. Ocean, Newport Beach, Calif. 92663

[21] Appl. No.: 18,924

[22] Filed: Feb. 25, 1987

[51] Int. Cl.$^4$ .............................. H04J 1/02; H04J 1/00
[52] U.S. Cl. ..................................... 370/76; 370/123; 370/124; 370/95; 379/94
[58] Field of Search .................. 370/76, 123, 71, 68.1, 370/110.1, 124, 89, 95; 379/94, 93

[56] References Cited

U.S. PATENT DOCUMENTS 4,339,816  7/1982  Reed ..................................... 370/76
4,644,526  2/1987  Wu ....................................... 370/124
4,646,296  1/1987  Bartholet et al. ..................... 370/76

Primary Examiner—Douglas W. Olms
Assistant Examiner—Frank M. Scutch, III
Attorney, Agent, or Firm—Freilich, Hornbaker, Rosen & Fernandez

[57] ABSTRACT

A network for enabling a local area telephone system to simultaneously carry digital data and analog voice signals on the same tansmission medium. Such a system typically includes a PBX and twisted wire pairs connected to distributed telephone handsets. The network incorporates distributed station units for coupling both voice band signals from telephone handsets and RF signals from data devices to the wire pairs. The station units are physically interconnected in a star configuration with respect to a hub module preferably located in a telephone closet. The hub module includes a plurality of hub units, each uniquely connected by a wire pair to one of the station units. Each station unit and each hub unit incorporates passive filter means to separate voice band and RF band signals. A token passing procedure is used to assign network control to the multiple station units in logical sequence.

26 Claims, 8 Drawing Sheets

SYSTEM FOR COMMUNICATING DIGITAL DATA ON A STANDARD OFFICE TELEPHONE SYSTEM

FIELD OF THE INVENTION

This invention relates generally to local area networks (LAN's) useful for interconnecting digital data devices such as computers, disk drives, and other peripherals and more particularly to innovations which enable a standard office telephone system to simultaneously carry digital data signals and analog voice signals on the same transmission medium.

BACKGROUND OF THE INVENTION

The prior art is replete with patents directed to local area networks for providing communication between various digital data devices located at a common site. Additionally, several such patents relate to networks intended to simultaneously transmit voice and digital data. For example, see:

| | |
|---|---|
| 4,262,171 | Schneider et al. |
| 4,330,687 | Foulkes et al. |
| 4,335,464 | Armstrong |
| 4,387,271 | Artom |
| 4,390,986 | Moses |
| 4,425,642 | Moses et al. |
| 4,449,218 | Strehl |
| 4,456,985 | Carsten et al. |
| 4,523,311 | Lee et al. |
| Re. 31,510 | Carbrey |

Other patents of interest concerning local area networks include:

| | |
|---|---|
| 4,251,879 | Clark |
| 4,317,196 | Ulug |
| 4,434,463 | Quinquis et al. |
| 4,445,213 | Baugh et al. |
| 4,450,554 | Steensma et al. |
| 4,503,532 | Tobagi et al. |

SUMMARY OF THE INVENTION

The present invention is directed to innovations which enable a standard local area telephone system to simultaneously carry both analog voice and digital data on the same transmission medium without significant interference. More specifically, the invention is directed to innovations in a standard office telephone system including, for example, a PBX and twisted wire pairs connected to distributed stations, for enabling distributed digital data devices to communicate over those same wire pairs.

In a typical network in accordance with the invention, a plurality of distributed station units are physically interconnected in a star configuration with respect to a hub module located in a telephone closet. The hub module includes a plurality of hub units, each uniquely connected, preferably by a single existing twisted wire pair, to one of the station units. Each station unit functions to combine voice signals, as for example from a conventional telephone handset, and data signals, as for example from computers and peripherals, for transmission to the hub unit connected thereto. Each hub unit separates the voice and data, sending voice signals to the local (e.g. PBX) or public telephone exchange and data signals to all of the other hub units for transmission over the network, via the existing wire pairs, to all of the station units connected thereto.

In a preferred embodiment of the invention, a token passing procedure is used to assign network control to the multiple station units in logical sequence. Each station unit has a unique logical address. The station unit holding the token (i.e. the "control" or "normal" token) is in control of the network and can pass the token (i.e. a unique data frame including a destination station address) to the next station unit. The token is received by all station units but only the addressed station unit can accept the token and thus acquire network control; i.e. the ability to transmit data over the network.

In accordance with the preferred embodiment, digital data is placed on the network at an RF bit rate (e.g. 1.0 MHz) in a Manchester encoded format. Passive analog filtering is used to separate voice band and RF band signals and discourage the introduction of Manchester-induced audible noise into the telephone handsets. In the disclosed exemplary embodiment each station unit and each hub unit includes both a low pass filter (e.g. having a cut-off frequency of about 4.0 KHz) to pass voice signals and a high pass filter (e.g. having a low frequency cut-off of about 100.0 KHz) to pass data signals. The filters function to separate received voice and data signals and additionally to prevent Manchester-induced noise at a station from producing audible noise in the telephone handset at the same station.

In accordance with a feature of the invention, in order to minimize noise in the voice band attributable to low frequency switching in the data band (i.e. Manchester bursts with intervening gaps), the transmitting station is operated so as to generate pseudo or idle Manchester data to fill in such gaps.

In accordance with a significant aspect of the preferred embodiment, after a station accepts the token, it waits until the termination of valid Manchester code on he network before initiating its own Manchester encoded transmission. At the conclusion of its transmission, it passes the token to another station.

In accordance with a further aspect of the invention, after a station attempts to pass the token, it goes into a receive mode and listens to the network for valid Manchester code. If it fails to hear valid Manchester code (which would indicate that the token has been accepted), it again attempts to pass the token to the same station for a given number of times and if the attempt is then unsuccessful, it undertakes a reconfiguration (RECON) routine to establish a new next logical station address to which it will attempt to pass the token. The RECON routine is also executed periodically whenever a RECON timer times out.

In accordance with a still further aspect of the preferred embodiment, the RECON routine also functions to (1) restore the token if it is lost, (2) locate new stations added to the network and (3) adjust for stations removed from the network.

In accordance with a still further aspect of the preferred embodiment, means are provided for automatically disabling a hub unit transmitter in the event the station unit connected to that hub unit is powered off or disconnected from the network. As a consequence, the system permits telephone handsets and/or data devices to be arbitrarily connected and disconnected from the network. For example, if a station unit is disconnected from the network and a telephone substituted, the automatic disabling of the hub unit transmitter will allow the telephone to function normally for voice band signals without digital noise interference.

DETAILED DESCRIPTION

The present invention is directed to a high speed, low cost data communication system particularly suitable for office applications. More specifically, the present invention is directed to innovations which enable digital data devices to communicate over an existing office telephone system without interfering with voice communication, thus overcoming the high costs normally associated with the installation of additional cabling.

Figure 1:
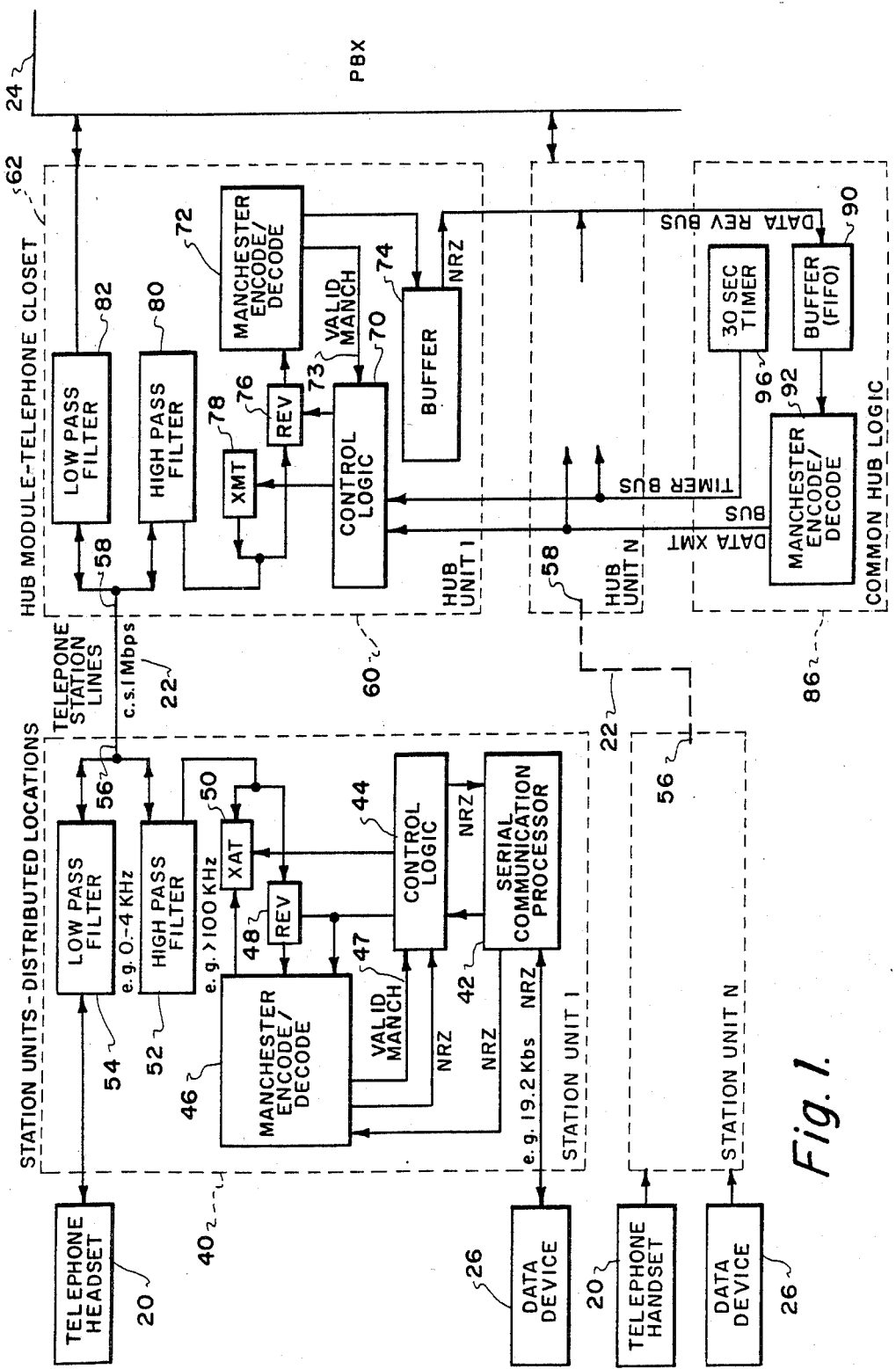
FIG. 1 is a block diagram of a system in accordance with the invention.

In accordance with the preferred embodiment to be described herein, a standard multistation office telephone system is modified to support a one megabit per second data link for communicating amongst multiple digital devices over existing twisted wire pairs. FIG. 1 depicts an exemplary system in accordance with the present invention wherein telephone handsets 20 at stations 1 through N are connected via twisted wire pair station lines 22 (typically less than 1000 feet) to a telephone exchange (e.g. PBX or Centrex) 24. The telephone handsets 20 are assumed to be conventional units which transmit and receive analog voice signals within a voice band below about 4.0 KHz. The telephones 20 are typically located at different physical locations, such locations being referred to herein as stations. It is in this standard office telephone system environment that components in accordance with the invention are utilized to permit communication of digital data between devices 26 distributed amongst the various stations. The devices 26 can, for example, comprise computers, disk and tape drives and printers.

More generally, modern office environments usually require the provision of some type of dedicated network to communicate data between digital devices distributed amongst various physical locations in the office facility. Generally, but not necessarily, each such location or station would have a telephone handset 20 and/or one or more digital devices 26. For clarity, it will be assumed herein that each station has only one telephone handset 20 and one digital device 26 associated with it, as is dedicated in FIG. 1. It will further be assumed that the digital devices are to communicate at an RF band bit rate of 1.0 MHz. and that the telephones 20 are to simultaneously communicate voice signals within a band below 4.0 KHz. The present invention is directed to a method and apparatus which enables both the RF digital signals and voice band analog signals to be simultaneously communicated over the same station lines 22 without interference so that digital data can be accurately received by any station and normal telephone communication will not be degraded.

In accordance with the invention, a plurality of station units 40 are provided, each being associated with a different station, for enabling the transmission and receiving of both RF band signals and voice band signals. A preferred station unit embodiment 40, as depicted in FIG. 1, includes RF band means comprising a serial communication processor 42, control logic 44, a Manchester encode / decode circuit 46, receive circuitry 48, transmit circuitry 50 and a high pass filter 52, and voice band means comprising a low pass filter 54. The filters 52, 54 are connected for bidirectional communication over station line pair 22 via station unit network terminal 56.

The station units 40 can be implemented as separate physical boxes but preferably comprise printed circuit boards which can be functionally accommodated in the digital devices 26. The telephone handsets 20 are preferably connected to the station units by standard commercially available modular telephone plugs and jacks (not shown). The network terminals 56 of station units 40 are similarly connected to the station lines 22.

The remote ends of station lines 22 are connected to network terminals 58 of hub units 60 which collectively comprise a hub module 62. The hub module 62 is typically housed in a telephone closet along with local exchange equipment; e.g. PBX 24. The station lines 22 all radiate outwardly from the central hub module 62 to the station units 40 in what is typically referred to as a physical star configuration. Each station line pair 22 uniquely connects one particular station unit 40 to one particular hub unit 60.

A preferred hub unit embodiment 60, as depicted in FIG. 1, includes RF band means comprising control logic 70, a Manchester encode / decode circuit 72, a buffer 74, receive circuitry 76, transmit circuitry 78, a high pass filter 80 and voice band means comprising a high pass filter 82. The filters 80, 82 are connected for bidirectional communication over station line pair 22 via hub unit network terminal 58.

The hub units 60, together with a common hub logic unit 86, form the hub module 62. Briefly, the outputs of buffers 74 of all hub units 60 are connected to a DATA RECEIVE BUS which in turn is connected to the input of a first in—first out (FIFO) buffer 90 in the common hub logic unit 86. The output of buffer 90 controls a Manchester encoder 92 whose output is supplied to a DATA TRANSMIT BUS which is coupled to the inputs of the control logic 70 in all hub units 60. The common hub logic unit 86 additionally includes a timer 96 (e.g. 30 seconds) whose output is coupled via a TIMER BUS to the inputs of the control logic 70 in all hub units 60. As will be discussed hereinafter in connection with FIG. 8, the function of timer 96 is to disable the transmitter 78 in each hub unit if the station unit connected thereto has been powered off or disconnected from the network. This feature enables the telephone handset at that station to continue to operate normally without digital noise interference.

Prior to considering the detailed operation of the system of FIG. 1, the function of the Manchester encoder/decoder circuits 46, 72, 92 should be understood. The Manchester encoder/decoder preferably comprises a semiconductor chip of the type sold commercially by Harris Semiconductor Products, as a Model HD6409.

The chip comprises a high speed low power device useful for serial data communication and can be operated in either a converter mode or a repeater mode. In the converter mode, the chip converts digital data in non-return-to-zero code (NRZ) into Manchester code and decodes Manchester code into NRZ code. The term "Manchester" code refers to the formatting of serial data in a manner which assures that the data signal exhibits at least one transition per bit interval. For example, a binary zero can be represented by a midinterval transition from low to high while a binary one can be represented by a mid interval transition from high to low. For serial data communication, Manchester code avoids some of the inherent deficiencies of NRZ code. For instance, use of Manchester code on a serial line eliminates DC components, provides clock recovery, and gives a relatively high degree of noise immunity. When operated in the repeater mode, the Manchester chip accepts Manchester code input and reconstructs it with a recovered clock. This minimizes the effects of noise on a serial data link.

From the foregoing general description of a Manchester encoder/decoder, it is pointed out that the device 46 depicted in the station unit 40 of FIG. 1 operates in the converter mode to accept NRZ code from the data device 26, via processor 42, to in turn, output Manchester code via transmit circuit 50 and high pass filter 52 to the station line 22. Likewise, the encoder / decoder 46 operates in the converter mode to accept Manchester code from line 22 via filter 52 and receive circuit 48 to output NRZ to the data device 26.

A system in accordance with the invention operates, as will be described in greater detail hereinafter, utilizing a token passing protocol. Briefly, a token passing protocol permits only one station at a time to transmit onto the network. A station is able to transmit only when it has the token. The "token" refers to a unique data frame (including a destination station address) which is passed in sequence from one station unit to the next. When a station unit accepts the token addressed to it, it is able to transmit data. Upon completion of its transmission, it generates the token and the logical address of a succeeding station unit and the token can then be passed to that succeeding unit. In a typical system in accordance with the invention, up to 255 stations can be accommodated. Accordingly, an address register (not shown) in each station unit processor 42 will store an address, between 0 and 254, uniquely identifying that station unit. When the station unit receives a data frame, its processor 42 will examine the received frame to determine whether it is addressed to that station unit and, if so, what further action should be taken. The operation of the processor 42 will be discussed in detail hereinafter in connection with FIGS. 7A and 7B.

Figure 2:
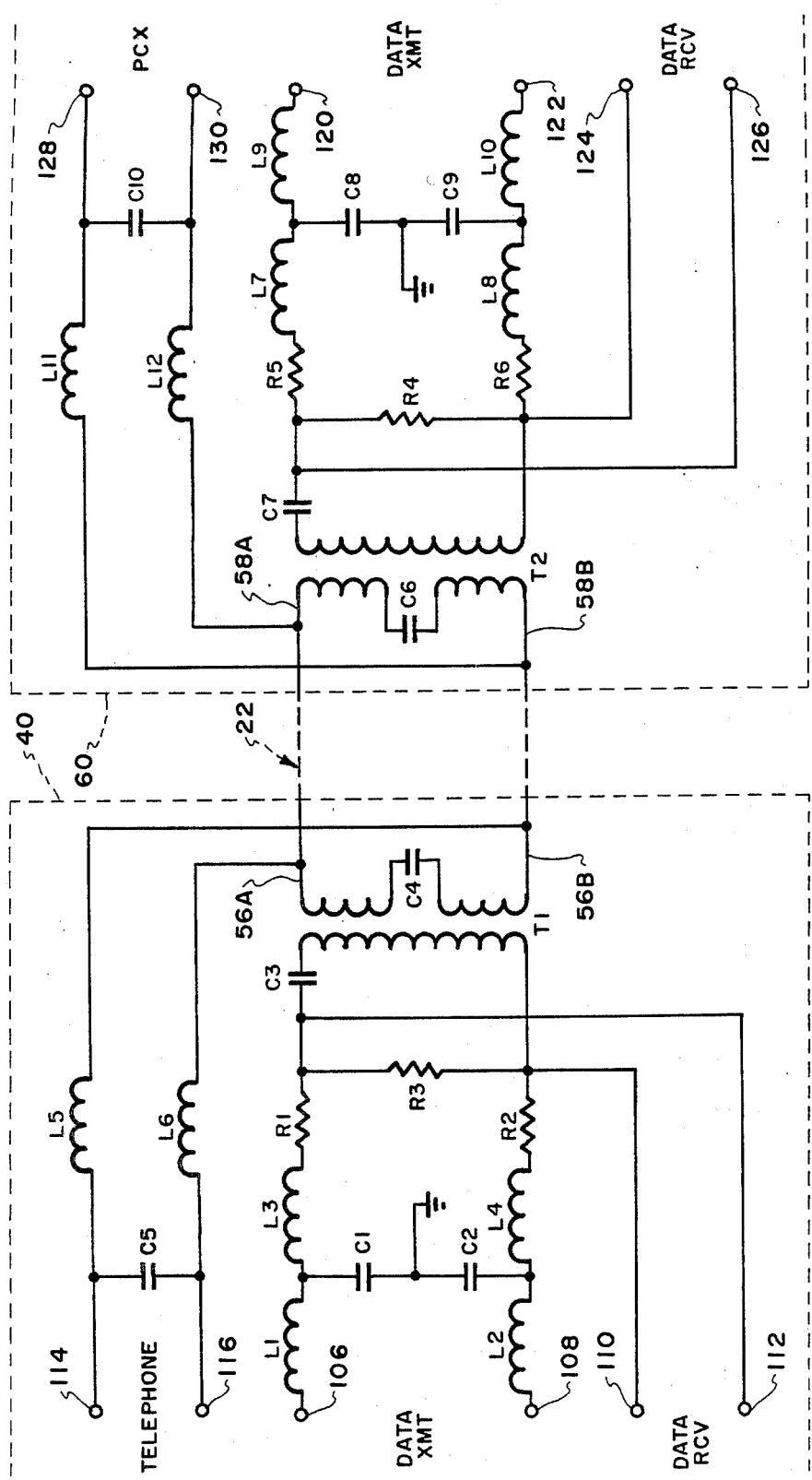
FIG. 2 is a schematic diagram of a station unit and hub unit filter circuits depicted in FIG. 1.

Attention is now directed to FIG. 2 which illustrates a preferred embodiment of filter circuits 52,54 of station unit 40 and filter circuits 80,82 of hub unit 60. The filter circuits 52, 54 include a pair of DATA TRANSMIT terminals 106, 108, DATA RECEIVE terminals 110, 112 and TELEPHONE terminals 114, 116. Additionally, the filter circuits include the aforementioned network terminal pair 56, i.e. terminals 56A, 56B. Similarly, filter circuits 80, 82 include a pair of DATA TRANSMIT terminals 120, 122, a pair of DATA RECEIVE terminals 124, 126, a pair of EXCHANGE terminals 128, 130 and the aforementioned network terminal pair 58, i.e. terminals 58A, 58B.

Inductors L1, L2, L3, L4 and capacitors C1, C2, comprise RF filter components which together form a low pass filter (upper cut-off approximately 20 MHz) to minimize RF radiation. Inductors L7, L8, L9, L10 and capacitors C8, C9 similarly form a low pass filter for the same purpose.

Resistors R1, R2, R3, capacitors C3, C4, together with the primary winding of transformer T1 form the aforementioned high pass filter 52. Similarly resistors R4, R5, R6, capacitors C6, C7, together with the primary winding of transformer T2 form the aforementioned high pass filter 80.

Inductors L5, L6, and capacitors C4 and C5 comprise voice band filter components which together form low pass filter 54. Similarly inductors L11, L12 and capacitors C6 and C10 form the los pass filter 82.

Figure 3:
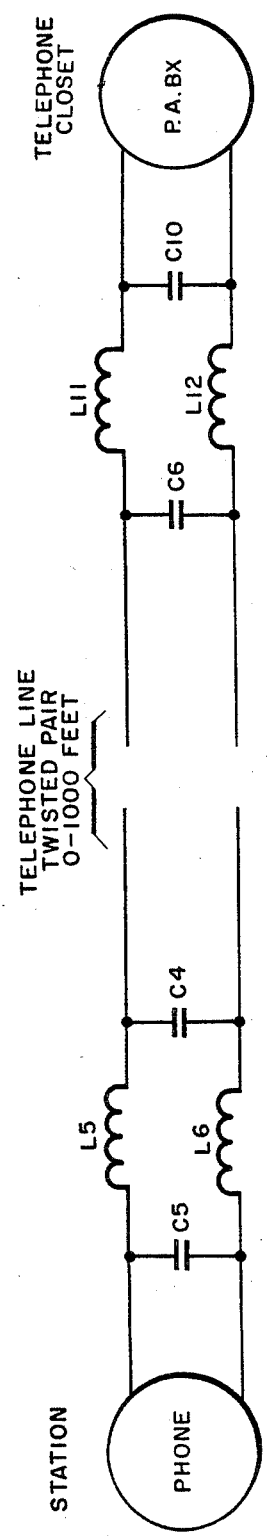
FIG. 3 is an equivalent circuit depicting the voice band filtering in the filter circuit of FIG. 4.

Attention is now directed to FIG. 3 which illustrates an approximate equivalent circuit for the low pass filter 54 of FIGS. 1, 2. The values of inductors L5, L6, L11 and L12 and capacitors C4, C5, C6, and C10 are chosen to create a low pass Butterworth filter when terminated by the telephone impedance at one end and the PBX impedance at the other end. Component values are selected so that the cut off frequency of filter 54 is approximately 4.0 KHz; i.e. high enough to ensure integrity of the voice band and low enough to provide sufficient attenuation of noise above the voice band.

Figure 4:
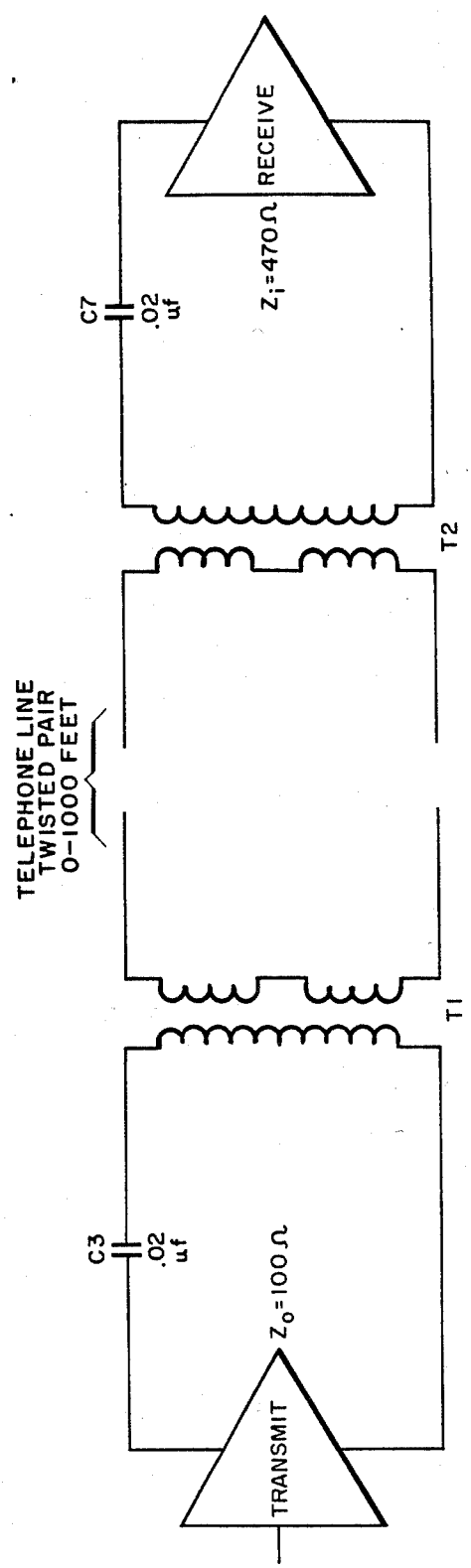
FIG. 4 is an equivalent circuit depicting the RF band filtering in the filter circuit of FIG. 4.

FIG. 4 illustrates an approximate equivalent circuit for the high pass filter 52 of FIGS. 1, 2 assuming that the impedance of capacitors C4 and C6 is low compared to transformers T1 and T2. Component values are selected so that the low frequency cut-off is preferably about 100 KHz, low enough to preserve the integrity of Manchester data and high enough to attenuate Manchester noise in the voice channel. The low frequency cut-off of approximately 100 KHz is determined by the values of C3, C7, Z0, and ZI and the transformer primary inductances. If a station is transmitting, the station transmitter output impedance in series with R1 and R2 is paralleled by R3 and the resultant impedance is approximately 100 ohms. If a hub unit is receiving, its transmitter is disabled (open circuited) and, since the receiver input impedance is very high, the effective input impedance R4 is approximately 470 ohms. Note that for RF, the line 22 is terminated in its approximate characteristic impedance at its transmitting end only. This arrangement serves to eliminate multiple reflections and reduce crosstalk with minimum power consumption.

The use of passive analog filtering as represented by FIGS. 2, 3, and 4 is at first consideration seemingly sufficient to separate the voice band below 4 KHz from the RF band above 50 KHz. However, in practice, it has been found that the transmission of Manchester encoded data generates noise in the voice band which is audible to a user of telephone 20. Such Manchester-induced noise is principally attributable to two factors; namely (1) "Fourier noise" due to high order sidebands of the Manchester data stream caused by modulating the data stream on and off; and (2) direct noise due to direct injection of the on-off modulating signal itself into the telephone handset.

More particularly, a constant stream of Manchester data contains very little energy in the voice band. However, data typically occurs in bursts with intervening gaps during which no data transmission takes place. As an example, consider a Manchester data stream of 10101010 having a 1 MHz bit rate. The stream will have an effective frequency of approximately 500 KHz. If we choose exactly 501 KHz for the example and modulate it on and off at a 2 KHz rate, the Fourier spectrum (before any filtering) has components at 501 KHz±2 nKHz where "n" is the order of the sideband as is depicted in FIG. 5A.

Figure 5A:
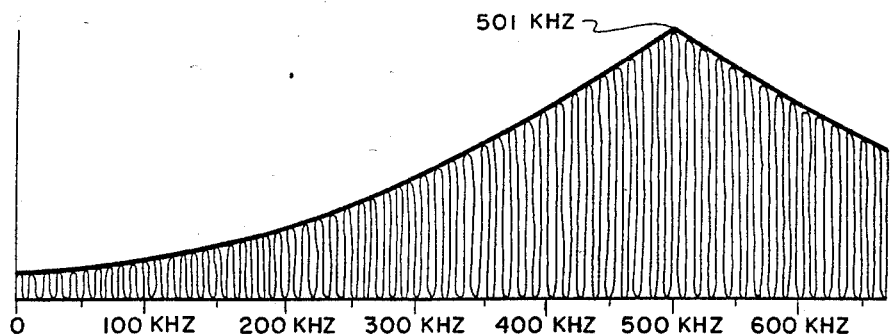
FIGS. 5a through 5d are a simplified amplitude versus frequency diagram for the Manchester-encoded signal showing noise induced within the voice band.
Figure 5B:
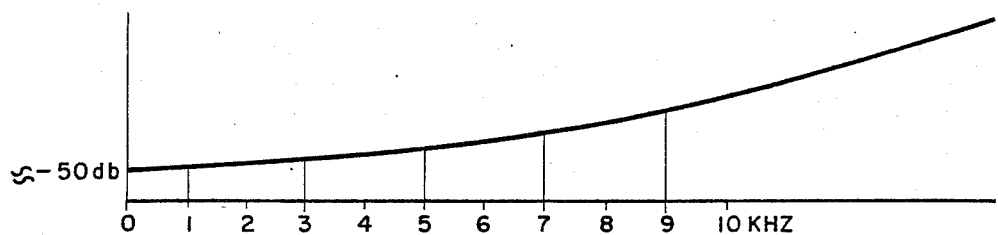

FIG. 5B shows the low-frequency portion of FIG. 5A, expanded to show the Fourier components at 1, 3, 5, 7, 9—KHz, with amplitudes in the range of −50 db. These Fourier noise components are a fixed, predictable consequence of modulating the Manchester data stream.

Figure 5C:
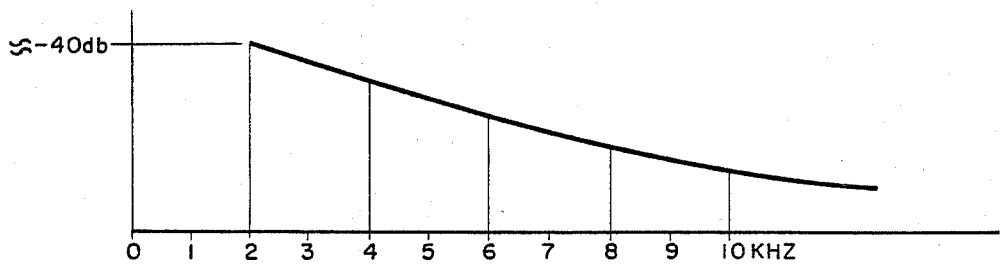
Figure 5D:
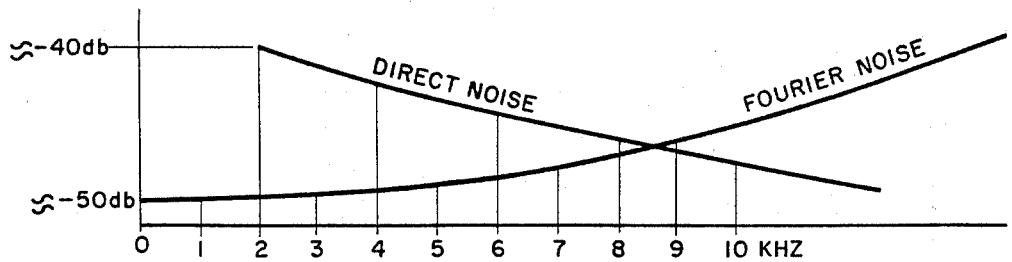

The "direct noise" components, on the other hand, have an amplitude which depend upon a number of circuitry details such as stray capacity, magnetic induction, signal level during the "off" portion of the modulation cycle, slight non-linearities at any point in the signal path, etc. These direct noise components, whose amplitude may be greater or less than that of the Fourier noise occur at the fundamental and harmonic frequencies of the 2 KHz modulating signal and are shown in FIG. 5C. FIG. 5D shows the combined spectrum of Fourier and direct noise.

Fourier noise and direct noise at frequencies above 4 KHz are isolated from the telephone 20 by the low-pass filter 52. However, such passive filtering is obviously useless for noise frequencies below 4 KHz.

In accordance with one aspect of embodiments of the invention, Fourier noise and direct noise are both reduced by minimizing the off-time of the Manchester data stream. In the limiting case of zero off time, the Fourier noise and direct noise virtually disappear.

It is further pointed out that by using high and low pass filtering as depicted in FIG. 1, both Fourier noise and direct noise frequencies below 4 KHz are attenuated before reaching the telephone 20 by the high pass filter 52 between the Manchester transmitter chip 50 and the telephone 20. The cut-off frequency of this filter 52 must be high enough to reduce the noise but low enough to maintain the integrity of the Manchester data.

In order to increase the modulating signal duty cycle and achieve the aforementioned very short off-times, means are provided in accordance with the invention for generating Manchester idle data to reduce the gap (or off-time) durations. This is achieved in accordance with the invention by causing each station unit to continue to generate idle data for a certain interval after it would normally terminate its transmission to fill in the gap until the next station unit is transmitting.

Figure 7A:
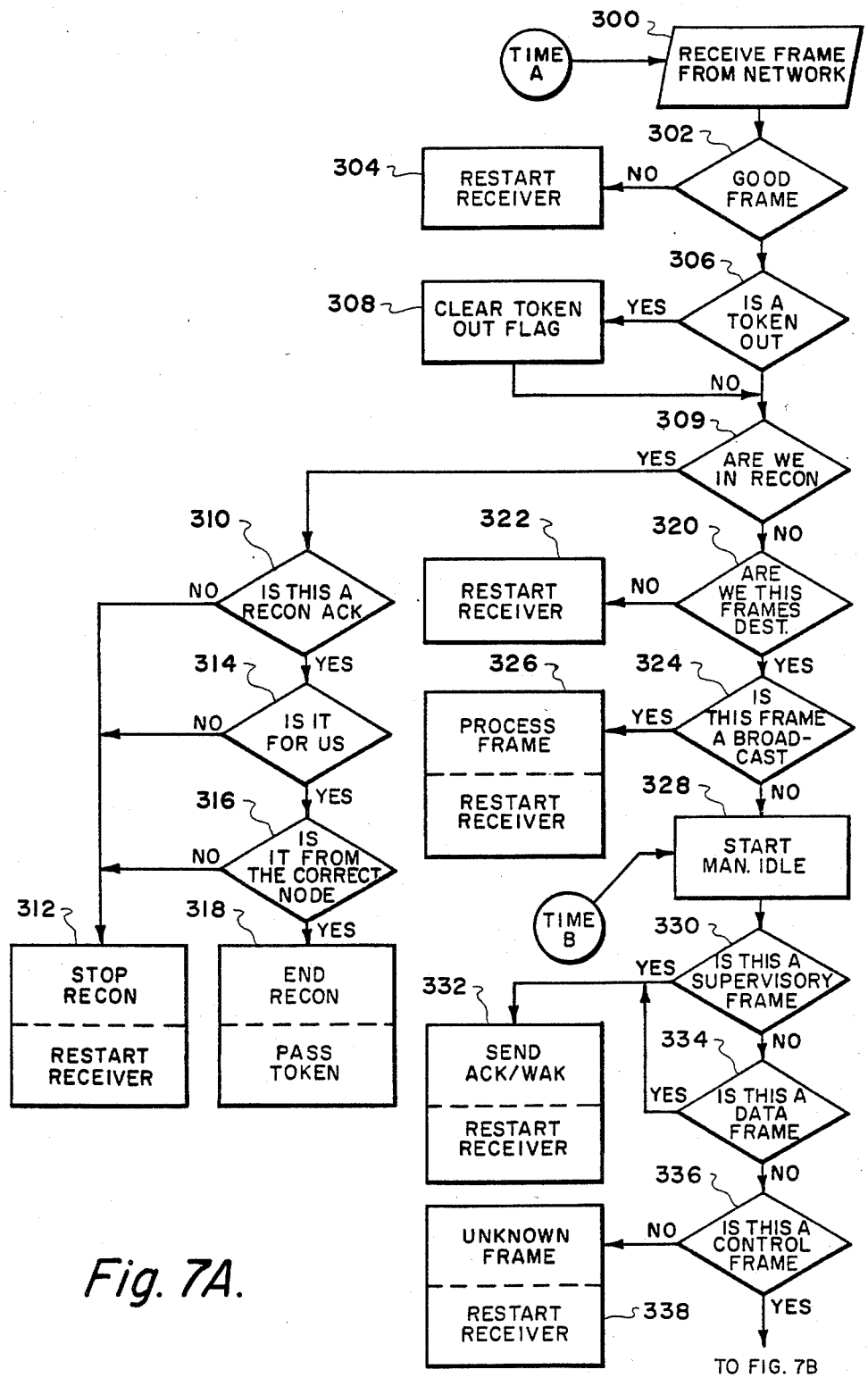
FIGS. 7A, 7B and 7C a flow chart explaining the operation of the network station units.
Figure 7B:
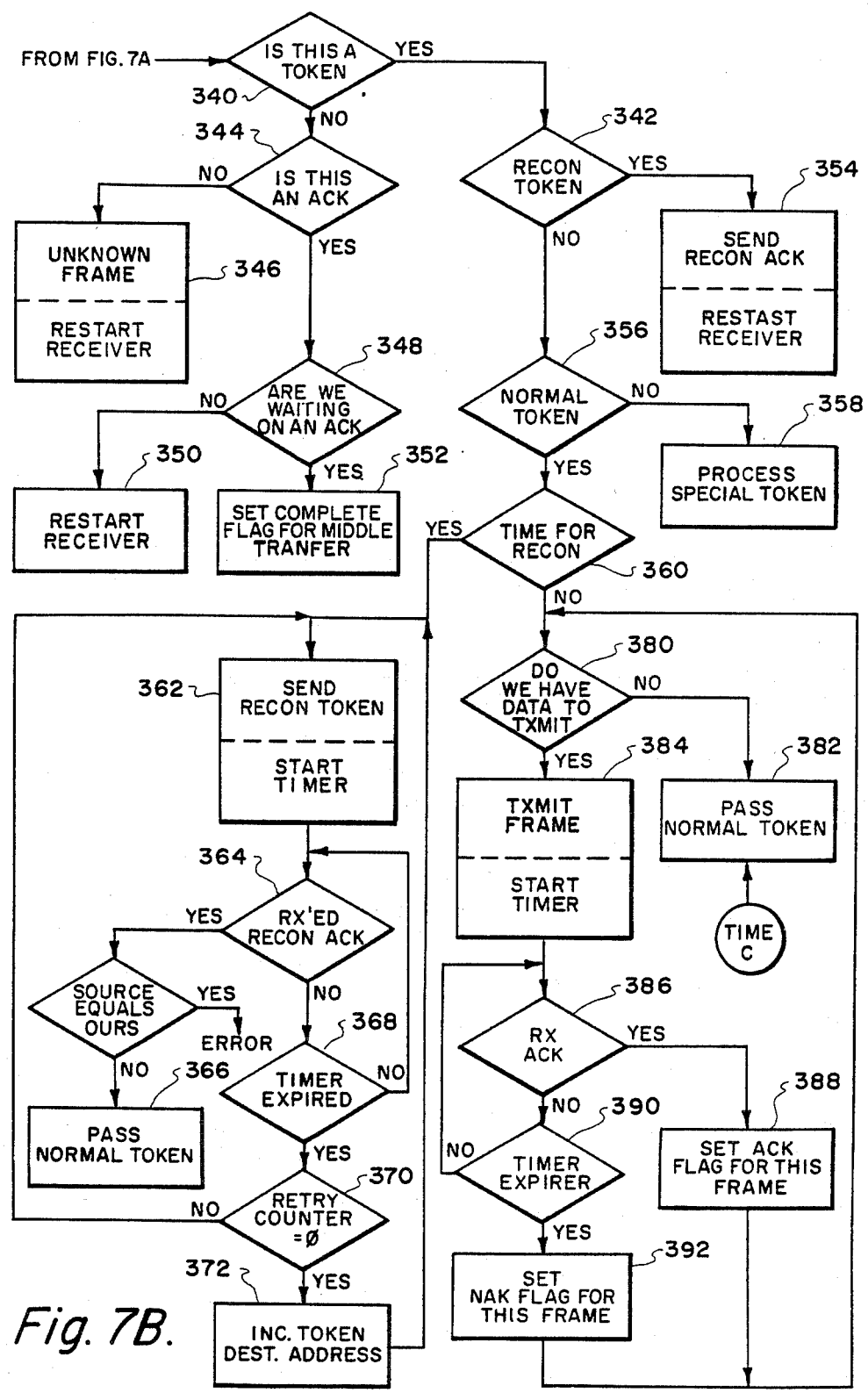
Figure 7C:
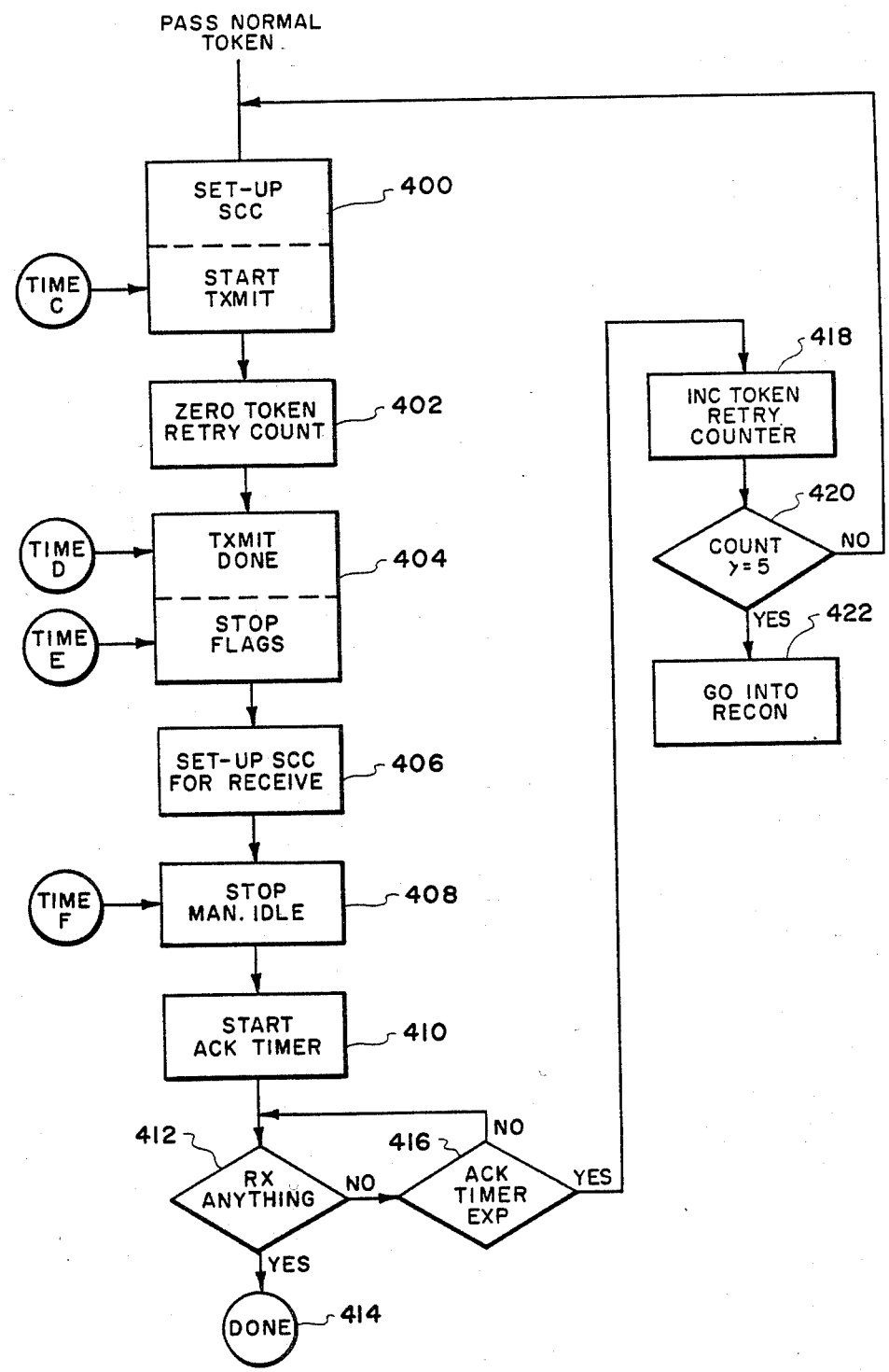

Attention is now directed to FIGS. 7A and 7B which comprise flow charts depicting the operation of the communication processor 42 in each station unit 40. Each processor 42 executes the operational sequence depicted by the flow charts under the control of a program, preferably stored as firmware, within the memory of processor 42. Firmware control of processor operations, is, of course, well known in the art.

Specifically, the flow charts of FIGS. 7A and 7B described the operational sequences for token passing, i.e. both token generation and acknowledgment, both for control (i.e. normal) tokens and special tokens, primarily the reconfigure (RECON) token. Briefly, the RECON token is generated as part of a RECON routine which is periodically executed (e.g. once every 15 seconds) to integrate into the network newly connected stations, or immediately executed to adjust for stations disconnected from the network. Execution of the RECON routine also assures restoration of the normal token should it ever get "lost". In the following description of the flow charts, when a reference to the RECON token is intended, it will always be referred to as the "RECON" token. The "control" or "normal" token may sometimes merely be referred to as the "token".

Figure 6:
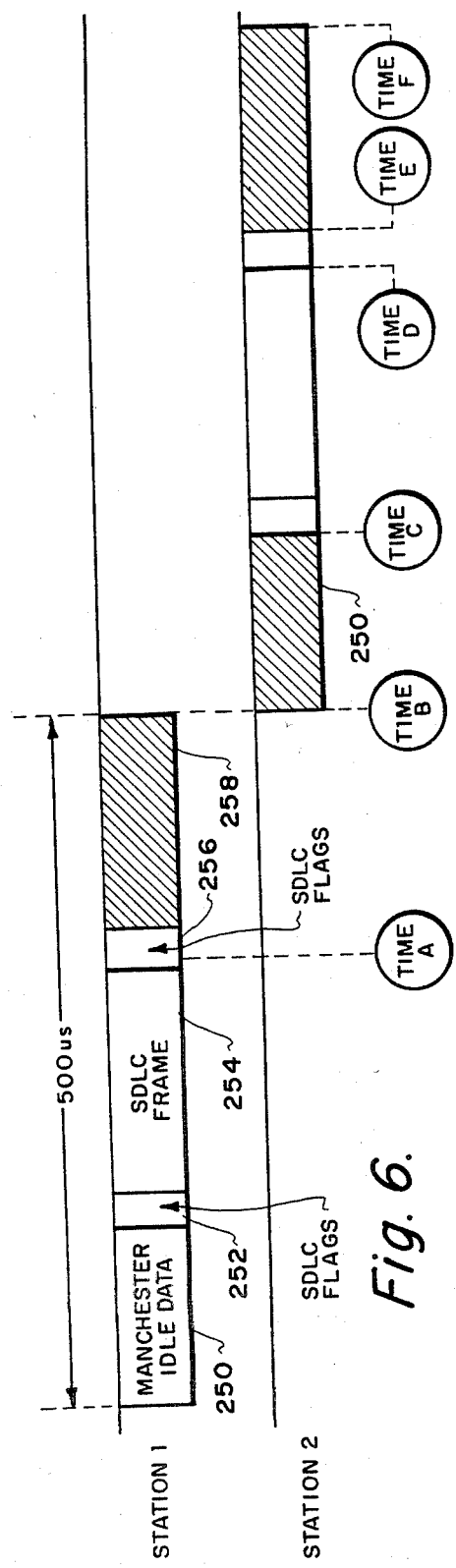
FIG. 6 is a simplified timing diagram depicting the typical operation of the network station units.

FIG. 6 generally depicts the timing associated with the passing of a normal token from a first station (Station 1) to the next logical station (Station 2). As can be seen from FIG. 6, the transmission envelope from a station onto the network is generally comprised of a first interval 250 in which Manchester idle data (e.g. a sequence of binary ones) is applied to the network. In a second interval 252, the transmitting station generates SDLC (Serial Data Link Control) flags which act as a header to identify the beginning of the next interval 254 in which an SDLC data frame is applied to the network. After the data has been transmitted, additional SDLC flags are transmitted in the interval 256 to identify the end of the data frame. Thereafter, an interval 258 containing additional Manchester idle data is applied to the network.

Assume that the information packet represented in FIG. 6 for Station 1 addresses Station 2. At time A, station 2 will recognize that it is the destination station and will set up its hardware to start transmitting Manchester idle data. However, station 2 will not actually be freed to start its transmission unit station 1 terminates its transmission at time B. That is, briefly referring to FIG. 1, and as will be discussed hereinafter in connection with the flow charts of FIGS. 7A and 7B, the processor 42 and control logic 44 will set up the transmitter 50 to transmit Manchester idle generated by the encoder / decoder 46. However, as long as the station is receiving valid Manchester code from the network, its encoder / decoder 46 will provide a valid Manchester output at 47 which will inhibit station 2 from actually putting data onto the network. When station 1 terminates its transmission at B and valid Manchester is no longer present on the network, then station 2 (FIG. 6) initiates its Manchester idle interval 250. Station 2 then steps through the intervals of a transmission in the same manner as was previously discussed for station 1, that is defining intervals 252, 254, 256, and 258. The timing points of FIG. 6, i.e. times A, B, C, D, E, and F will be referred to in the ensuing discussion of the flow charts of FIGS. 7A and 7B.

The flow chart of FIG. 7A describes the operation of the processor 42 at station 2, beginning with time A as depicted in FIG. 6. Before proceeding with an explanation of the flow charts of FIGS. 7A and 7B, it is pointed out that the charts are primarily comprised of rectangle shaped and diamond shaped blocks. The rectangle shaped blocks represent operations whereas the diamond shaped blocks represent decision points. The timing points of FIG. 6 are shown within circular blocks on the flow charts of FIGS. 7A and 7B.

FIG. 7A begins with station 2 receiving a frame from the network at time A (block 300). A check is then made to determine whether or not the frame is good, i.e. whether or not it contains any errors (block 302). If the frame is not good, then the station unit's receiver 48 is restarted (block 304). If the frame is good, then the processor determines whether a token is out, that is whether the station unit has sent a token and is currently waiting for a response (block 306). If a token is out, then the token out flag is cleared (block 308). If no token is out, then operation proceeds to decision block 309 which determines whether the station unit at that point in time is in a reconfiguration (RECON) mode (block 309). If the station unit is in the RECON mode, then decision block 310 checks to see whether this received frame is a RECON acknowledgment (RECON ACK) (block 310). If it is not, then operation proceeds to block 312 in which the RECON mode is terminated and the receiver 48 is restarted to listen to the network. On the other hand, if decision block 310 determines that the received frame is a RECON acknowledgment, decision block 314 determines whether this station unit is indeed the destination station for the received frame. If not, operation proceeds to aforementioned block 312. If this station unit is the destination station unit, block 316 determines whether the received frame is from the correct station (or node). If it is not, operation proceeds to aforementioned block 312. If the RECON acknowledgment is from the correct station, then the RECON mode is terminated and a normal token is passed, as will be described more specifically in connection with the flow chart of FIG. 7B.

Returning now to block 309, assume that the station unit is not in the RECON mode when the frame represented by block 300 is received. Decision block 320 determines whether this station is the correct destination of the frame. If it is not, then this station unit restarts its receiver 48 (block 322). On the other hand, if this station unit is the destination, then decision block 324 determines whether this frame is of a particular type referred to as a broadcast frame. A "broadcast frame" is a frame intended to be received and operated on by all station units on the network (e.g. having a destination address 255). If the frame is a broadcast frame, then it is processed and the receiver 48 is restarted (block 326). However, if the received frame is not a broadcast frame, then this station unit goes into a Manchester idle state at time B (block 328). Although this station unit, i.e. station 2 goes into the Manchester idle state, it will not actually turn on its transmitter 50 until its receiver 48 no longer sees valid Manchester on the network, as represented by input 49 to control logic 44 of FIG. 1. That is, the termination of Manchester idle data on the network supplied by station 1 will allow station 2 to start transmitting Manchester idle data on the network. Thus time B of FIG. 6 essentially represented a butt point between the station 1 transmission on the network terminating and the station 2 transmission beginning.

Block 330 determines whether the received frame is a supervisory frame. If yes, the station unit sends an acknowledgment and restarts its receiver (block 332). If this is not a supervisory frame, then decision block 334 determines whether the received frame is a data frame. If it is, then block 332 is executed. If it is not, then block 336 determines whether the received frame is a control frame or in other words some type of token which is utilized to transfer network control between stations. The primary token types of interest are the normal or control token and a RECON token. Brief reference will be made hereinafter to a third type or special token but this third type is only of minimal interest in connection with the present invention. If block 336 determines that the received frame is not a control frame, then block 338 is executed meaning that the received frame is of unknown character and it is not clear what action to take. Therefore, it is essentially ignored by restarting the receiver to listen for further frames on the network (block 338).

If the frame is a control frame, then decision block 340 determines whether or not it is a token. If it is a token, operation proceeds to the branch represented by decision block 342 which determines whether the token is a RECON token. On the other hand, if the received control frame is not a token, then operation proceeds from decision block 340 to decision block 344 which determines whether the received control frame is an acknowledgment (ACK). If it is not, then the frame is treated as an unknown frame essentially ignored, and the receive is restarted (block 346). If, on the other hand, the received control frame is an acknowledgment, then block 348 determines whether or not the station unit is waiting for an acknowledgment. If not, the receiver is restarted (block 350) to await further incoming frames from the network. If we are waiting for an acknowledgment, then operation proceeds from block 348 to block 352 which sets a flag to identify the completion of the operation.

Returning now to decision block 342 which determines whether the received control frame is a RECON token. If it is, then operation proceeds to block 354 which sends a RECON acknowledgment and restarts the receiver. Otherwise, decision block 356 determines whether the token is a normal token. If not, then the token must be a special token and it is processed as represented by block 358. On the other hand if the received token is a normal token, then decision block 360 determines whether it is time to execute the RECON routine. The system includes a RECON timer which periodically times out, herein assumed to be 15 seconds. Thus, approximately every 15 seconds, the processor executes a RECON routine initiated by block 360 indicating that the RECON timer has timed out.

As previously discussed, the RECON routine is periodically executed for the purpose of integrating into the network newly connected stations, to adjust for stations disconnected from the network, and to assure restoration of the normal token should it ever get "lost". The RECON routine starts with block 362 which involves the station unit transmitting a RECON token and by starting an acknowledgment timer. Operation proceeds to decision block 364 which determines whether a RECON acknowledgment has been received. If yes, then operation proceeds to block 366 which causes a normal token to be passed, as will be described in connection with FIG. 7B. If a RECON acknowledgment has not been received, then decision block 368 determines whether the acknowledgment timer started in block 362 has yet expired. If not, operation loops back to decision block 364. On the other hand, if the acknowledgment timer has expired, then operation proceeds to block 370 which decrements a user setable retry counter and determines whether the retry counter yet equals zero. More specifically, assume that the retry counter is always set to a count of five when the RECON timer times out. If this is the case, then, in executing the RECON routine, operation will proceed from block 362 to block 370 and loop back again for a total of five tries, each try involving sending the RECON token and listening for a RECON acknowledgment. Once the retry counter is decremented to zero, then operation proceeds to block 372 which increments the destination address of the token. For example, assume a typical system accommodating up to 255 stations. Assume initially that all stations are connected to the network so that each normally passes its token to the immediately succeeding station. Thus, for example, station 7 normally passes its token to station 8. Now assume that station 8 has been disconnected from the network. This, of course, is accomplished by simply withdrawing the station 8 modular telephone plug from its telephone jack. In this event, when station 7 attempts to pass a RECON token to station 8, it will not get a RECON acknowledgment since station 8 is no longer connected to the network. Station 7 will complete a certain number of tries, previously assumed to be five, in order to elicit a RECON acknowledgment from station 8. These tries of course mean proceeding from block 362 down through decision block 370 and looping back again to block 362. After five tries, station 7 will recognize that station 8 is no longer connected to the network and will increment the destination address in block 372, i.e. to station 9 in this example, and attempt to pass the RECON token to the new destination address.

In executing each RECON routine, the station initially uses its own address as the destination address for sending the RECON token. Unless the same address has been inadvertently assigned to two stations, this initial RECON token should not produce a RECON acknowledgment. If it does, the system goes into a an error mode. After the ACK timer times out, the destination address is incremented by one and another attempt is made to transfer the RECON token. This sequence will continue until the transmitting station receives a RECON acknowledgment. Thus, each time a station executes a RECON routine, it will find the station on the network having the next logical address and thus it will automatically adjust to stations being disconnected from the network or new stations being added to the network.

Returning now to block 360, assume that it is not yet time to execute the RECON routine. Decision block 380 then determines whether this station unit has data to transmit. If not, then operation proceeds to the pass normal token routine depicted in FIG. 7B. If on the other hand the station unit does have data to transmit, block 384 transmits the frame and starts an acknowledgment timer, again presumed to be 3 milliseconds. Block 386 looks for a received acknowledgment. If an acknowledgment is received, then an acknowledgment flag is set for this frame (block 388) and operation loops back to block 380 to determine whether there is further data to transmit. If an acknowledgment is not received, then decision block 390 determines whether the acknowledgment timer has expired. If not, then operation loops back to block 386 to continue to look for an acknowledgment. Once the acknowledgment timer has expired, operation proceeds to block 392 which causes the no acknowledgment (NAK) flag to be set for this frame. Then operation loops back to block 380 to test to see whether there is additional data to transmit.

Attention is now directed to FIG. 7B which depicts the pass normal token routine. This routine is entered, for example, from blocks 366 and 382 of FIG. 7A. Block 400 sets up the serial communication code and starts transmission at time C. A token retry counter is reset (that is, set to zero) in block 402. Thereafter, the transmission is completed and the stop SDLC flags are generated respectively at times D and E, represented by block 404. Thereafter, the serial communications processor is set up to receive (block 406) and Manchester idle data continues until time F, represented by block 408. The three millisecond acknowledgment timer is then started (block 410) and the processor listens to the network to see whether anything is received. If anything is received, it means that another station is transmitting and thus the token has been passed. Accordingly, the token passing operation is completed (block 414). If nothing is received before the acknowledgment timer expires (block 416) then operation proceeds to block 418 to increment the token retry counter which was reset at block 402. Decision block 420 determines whether the retry counter has reached five. If not, operation loops back to black 400. However, once the count exceeds five, then operation proceeds to the RECON routine (block 422); i.e. block 362 of FIG. 7A. Thus, whenever the system fails to successfully pass the normal token, it proceeds to the RECON routine to adjust the address of the next logical station.

Figure 8:
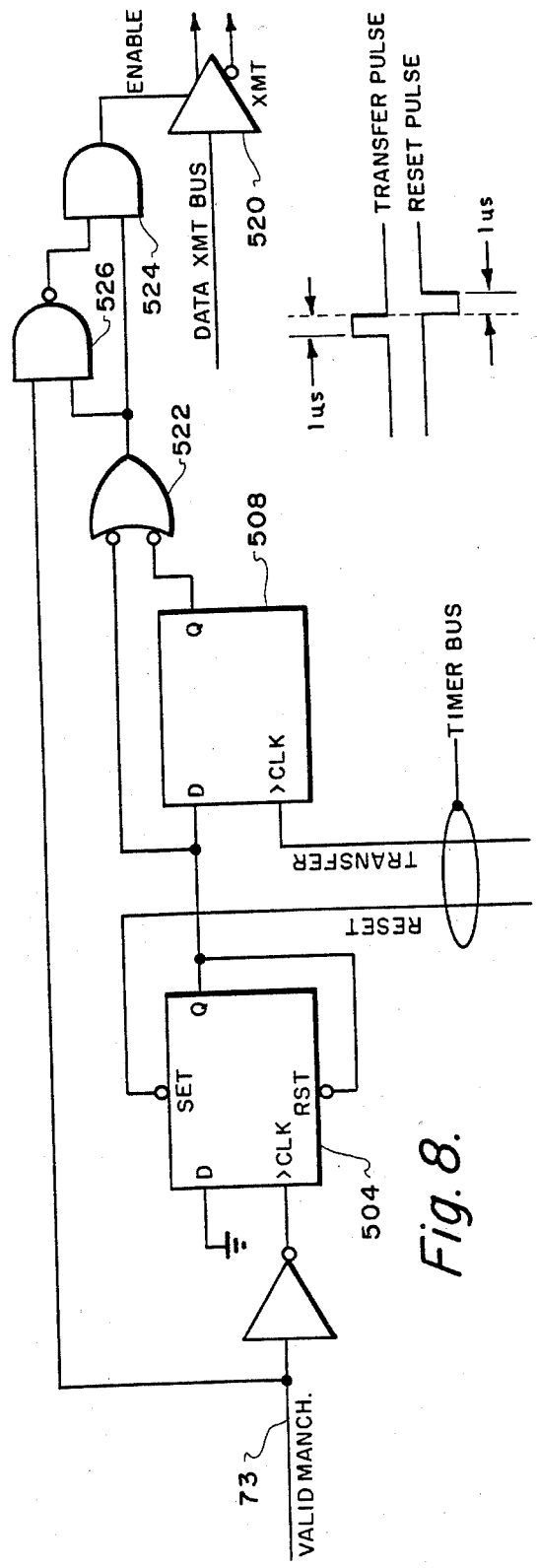
FIG. 8 is a block diagram depicting the hub module 20 of FIG. 1.

Attention is now directed to FIG. 8 which illustrates a block diagram of hub unit control logic 70. When a station is connected to the network, it transmits Manchester code to its hub unit at least every 15 seconds because of the stations aforementioned RECON timer. Each transmission causes the hub unit Manchester encoder/decoder chip (e.g. HD6409) 72 to output a valid Manchester signal on terminal 73. This valid Manchester indication is transferred to the flip flop 504. Timer 96, in the hub common logic 86, transfers the state of flip flop 504 to latch 508 every thirty seconds and reset flip flop 504. Thus, latch 508 of each hub unit will always be set if it is associated with an active station unit 40, i.e. a station unit which transmits Manchester code at least every fifteen seconds. With latch 508 set, transmit amplifier 520 of the hub unit is enabled via gates 522, 524.

On the other hand, assume that a station unit is removed from the network for more than fifteen seconds. In this situation, within the 30 second time of timer 96, the latch 508 will be reset and the transmitter amplifier 520 will be disabled via gates 522, 524 so that transmission can no longer occur to the removed station. Gate 526 disables hub unit transmitter 520 when the receiver is receiving valid Manchester.

From the foregoing, it should now be appreciated that a system has been disclosed herein for enabling the incorporation of a digital data communication capability in an existing local area telephone system comprised of distributed telephone jacks connected to installed telephone lines, typically twisted wire pairs. The system enables telephone handsets and/or data devices to be arbitrarily connected and disconnected from the Network. Thus, if, for example, a station unit is disconnected from a line, the transmitter in the hub unit connected to the remote end of that line will be disabled automatically by the hub unit control logic and timer 96. Thus, a data device and its station unit 40 can be disconnected from a line 22 and a telephone handset substituted because of the automatic disabling of the associated hub unit transmitter which thereby prevents the intrusion of digital noise into the handset.

The ability to carry digital data over the existing telephone lines without interfering with simultaneous voice communication is attributable to the use of both passive analog filtering and by techniques for eliminating noise components associated with the digital data transmission. Additionally, an improved network token passing scheme has been disclosed herein characterized by the utilization of a RECON routine which minimizes the risk of token loss and permits stations to be deleted from and added to the network.

Claims:

1. In combination with a local telephone network including a plurality of telephone handsets each located at a different station, and each adapted to be connected by a wire pair to a telephone exchange for communicating voice band signals therebetween, apparatus for enabling a plurality of digital data devices distributed amongst said stations to communicate data signals between one another over said wire pairs without interfering with said voice band signals, said apparatus comprising:

a plurality of station units, each located at a different one of said station, and each having a pair of station network terminals connected to a first end of one of said wire pairs;

low pass filter means in each of said station units for coupling one of said telephone handsets to said pair of station network terminals;

processing means in each of said station units responsive to data supplied by a data device connected thereto for outputting Manchester encoded data nd responsive to Manchester encoded data supplied thereto for outputting data to said data device;

means including high pass filter means in each of said station units for coupling said processing means to said pair of network terminals;

a plurality of hub units each having a pair of hub network terminals connected to a second end of one of said wire pairs;

low pass filter means in each of said hub units for coupling said pair of hub network terminals to said telephone exchange;

processing means in each of said hub units responsive to Manchester encoded data received at the hub network terminals of that hub unit for outputting related data to all other hub units for transmission via wire pairs to station units connected thereto; and means including high pass filter means in each of said hub units for coupling the processing means therein to the hub network terminals thereof.

2. The combination of claim 1 wherein said station unit low pass filter means comprises passive analog circuit means for bidirectionally coupling voice band signals between a telephone handset and one of said wire pairs.

3. The combination of claim 1 wherein said station unit high pass filter means comprises passive analog circuit means for bidirectionally coupling RF band signals between said station unit processing means and one of said wire pairs.

4. The combination of claim 1 wherein said hub unit low pass filter means comprises passive analog circuit means for bidirectionally coupling voice band signal between said telephone exchange and one of said wire pairs.

5. The combination of claim 1 wherein said hub unit high pass filter means comprises passive analog circuit means for bidirectionally coupling RF band signals between said hub unit processing means and one of said wire pairs.

6. The combination of claim 1 wherein each of said station unit processing means includes transmitter means for supplying said outputted Manchester encoded data to said high pass filter means; and further including means of enabling said station unit transmitter means on a mutually exclusive basis.

7. The combination of claim 6 wherein said means for enabling said station unit transmitter means includes means for passing a control token sequentially between said station units.

8. The combination of claim 7 wherein each of said station unit processing means includes:

a processor; and receiver means for coupling data received from said station network terminals, via said high pass filter means, to said processor.

9. The combination of claim 8 wherein each station unit is assigned a unique address; and wherein each station unit includes means for determining whether data received by the receiver means thereof is directed to that station unit.

10. The combination of claim 9 wherein each station unit includes means for periodically executing a reconfiguration routine to determined the address of the next sequential station unit.

11. The combination of claim 1 including means for disabling each of said hub units when the station unit connection thereto fails to output Manchester encoded data for a predetermined interval.

12. In a system including a plurality of stations where each station includes a voice telephone device and/or a digital data device, a network for interconnecting said devices for enabling voice communication between said telephone devices and digital communication between said data devices, said network including:

a plurality of station units each having a station network terminal;

a plurality of hub units each having a hub network terminal; and a plurality of lines each connecting the station network terminal of a different one of said station units to the hub network terminal of a different one of said hub units;

each of said station units including:

bidirectional voice band means of recoupling a telephone device to said station unit's station network terminal; and bidirectional RF band means for coupling a data device to said station unit's station network terminal;

each of said hub units including:

bidirectional voice band means for coupling said hub unit's hub network terminal to a telephone exchange; and bidirectional RF band means for coupling said hub unit's hub network terminal to all other hub units for transmission to station units connected thereto.

13. The system of claim 12 wherein said station unit RF band means includes means for generating an RF band signal and for modulating said signal by data supplied by the data device coupled thereto.

14. The system of claim 13 wherein said generated RF band signal is in Manchester encoded format.

15. The system of claim 13 wherein said station unit RF band means includes high pass filter means for coupling said generated RF band signal to said stations unit's station network terminal.

16. The system of claim 13 wherein said station unit voice band means includes low pass filter means for coupling said telephone device to said station units station network terminal.

17. The system of claim 13 wherein said hub unit RF band means includes mean responsive to an RF band signal received at said hub unit network terminal for coupling an RF band signal to all other hub units; and wherein said hub unit RF band means further includes transmitter means for transmitting RF band signals to the station unit connected thereto via one of said lines.

18. The system of claim 17 including means for disabling each of said hub unit transmitter means when the station unit connected thereto fails to generate said RF band signal for a predetermined timer interval.

19. In a system including a plurality of stations where each station includes a voice telephone device and/or a digital data device, a network for interconnecting said devices for enabling voice communication between said telephone devices and digital communication between said data device, said network including:

a plurality of station units each having a station network terminal;

a plurality of hub units each having a hub network terminal; and a plurality of separate lines each connecting the station network terminal of a different one of said station units to the hub network terminal of a different one of said hub units;

each of said station units including:

bidirectional low pass filter means for coupling a telephone device to said station unit's station network terminal;

transmitter means;

receiver means;

bidirectional high pass filter means for coupling said station unit's transmitter means and said receiver means to said station unit's station network terminal; and processing means including Manchester encode/decode means for generating a Mancester encoded signal modulated by data supplied by a data device to output Manchester encoded data to said transmitter means and responsive to Manchester encoded data received from said receiver means for supplying decoded data to said data device;

each of said hub units including:

bidirectional low pass filter means for coupling said hub unit's hub network terminal to a telephone exchange;

transmitter means;

receiver means;

bidirectional high pass filter means for coupling said hub unit's transmitter means and said receiver means to said hub unit's hub network terminal; and processing means responsive to Manchester encoded data received from said hub unit receiver means for supplying related Manchester encoded data to all other hub units for transmission to station units connected thereto.

20. The system of claim 12 wherein each station unit RF band means includes transmitter means and receiver means; and wherein said transmitter means is selectively actuatable, in response to a data stream supplied by a data device coupled thereto, for applying an RF band signal modulated by said data stream to the network terminal of that same station unit; and wherein said receiver means is responsive to a modulated RF band signal applied thereto from the network terminal of that same station unit for supplying a data stream to a data device coupled to that station unit.

21. The system of claim 20 including means for generating a control token and for passing said control token between said station units in sequence; and means in each station unit for actuating the transmitter means thereof only when that station unit holds said control token.

22. In combination with a local telephone network including a plurality of telephone handsets each located at a different station, and each adapted to be connected by a wire pair to a telephone exchange for communicating voice band signals therebetween, apparatus for enabling a plurality of data devices distributed amongst said stations to communicate digital data between one another over said wire pairs without interfering with said voice band signals, said apparatus comprising:

a plurality of station units, each located at a different one of said stations, and each having a pair of station network terminals connected to a first end of one of said wire pairs;

low pass filter means in each of said station units for coupling voice band signals supplied by a telephone handset connected thereto to said pair of station network terminals;

processing means in each of said station units for encoding data supplied by a data device connected thereto to output RF band serially encoded digital signals having substantially no DC component, and for decoding RF band serially encoded digital signals supplied thereto having substantially no DC component to output data to said data device;

means including high pass filter means in each of said station units for bidirectionally coupling said RF band signals between said processing means and said pair of network terminals;

a plurality of hub units each having a pair of hub network terminals connected to a second end of one of said wire pairs;

low pass filter means in each of said hub units for coupling said pair of hub network terminals to said telephone exchange;

processing means in each of said hub units responsive to RF band serially encoded digital signals having substantially no DC component received at the hub network terminals of that hub unit for outputting related RF band serially encoded digital signals to all other hub units for transmission via wire pairs to station units connected thereto; and means including high pass filter means in each of said hub units for bidirectionally coupling said RF band signals between the processing means therein and the hub network terminals thereof.

23. The combination of claim 22 wherein each of said low pass filter means comprises passive analog circuit means; and wherein each of said high pass filter means comprises passive analog circuit means.

24. The combination of claim 22 wherein each of said low pass filter means has an upper cut-off frequency of approximately 4.0 KHz and each of said high pass filter means has a lower cut-off frequency exceeding approximately 100.0 KHz.

25. The combination of claim 22 wherein each of said station unit processing means includes transmitter means for supplying said RF band serially encoded digital signals to said high pass filter means; and further including means for enabling said station unit transmitter means on a mutually exclusive basis.

26. The combination of claim 25 wherein said means for enabling said station unit transmitter means includes means for passing a control token sequentially between said station units.

* * * * *